United States Patent

Tan et al.

[11] 3,975,687
[45] Aug. 17, 1976

[54] BASEBAND SIGNAL SWITCHING ARRANGEMENT FOR DIVERSITY RECEPTION IN PCM RADIO COMMUNICATION SYSTEM

[75] Inventors: Yoichi Tan; Hiromi Hashimoto, both of Tokyo, Japan

[73] Assignee: Nippon Electric Company, Ltd., Tokyo, Japan

[22] Filed: Aug. 25, 1975

[21] Appl. No.: 607,722

[30] Foreign Application Priority Data

Aug. 24, 1974 Japan.............................. 49-97163

[52] U.S. Cl.................................. 325/304; 325/56
[51] Int. Cl.² ......................................... H04B 7/08
[58] Field of Search ..... 325/2, 56, 65, 40, 304–306, 325/322–324, 367, 368; 343/176

[56] References Cited
UNITED STATES PATENTS

| | | | |
|---|---|---|---|
| 3,213,370 | 10/1965 | Featherston | 325/304 |
| 3,354,433 | 11/1967 | Minc | 325/56 |
| 3,555,427 | 1/1971 | Hatton | 325/304 |

*Primary Examiner*—Robert L. Griffin
*Assistant Examiner*—Jin F. Ng
*Attorney, Agent, or Firm*—Sughrue, Rothwell, Mion, Zinn & Macpeak

[57] ABSTRACT

A baseband signal switching arrangement for the diversity reception of pulse-modulated microwaves is capable of selecting anyone of respective demodulated baseband digital signals without causing any bit errors in the output. The baseband signal switching arrangement includes a digital signal gate switch for selecting one of a plurality of digital signals and a clock signal gate switch for selecting a corresponding one of a plurality of clock signals extracted respectively from the digital signals. A delay circuit is provided for delaying the clock signal selected by the clock signal gate switch, and a control signal read-out circuit is arranged to be fed with the output of the delay circuit to read out a switching control signal so that the digital signal and clock signal gate switches are controlled simultaneously by the output of the control signal read-out circuit.

4 Claims, 8 Drawing Figures

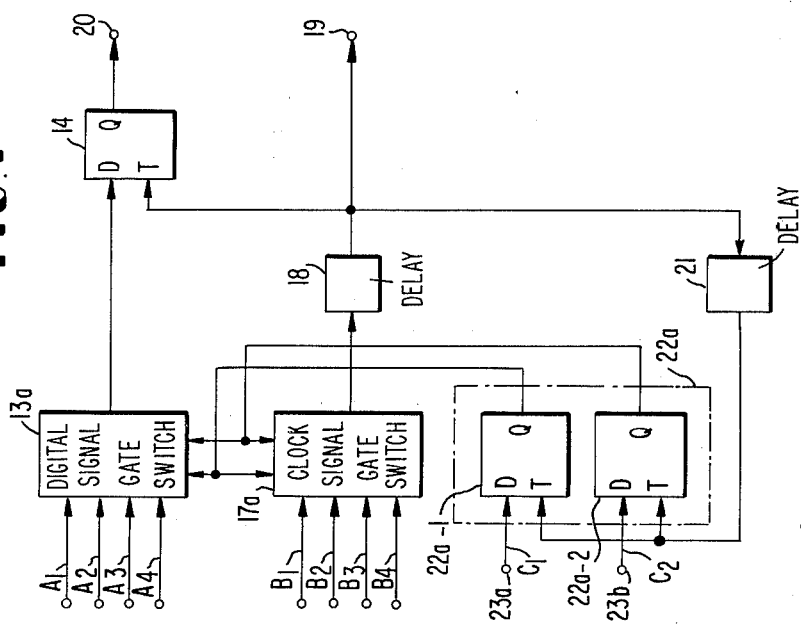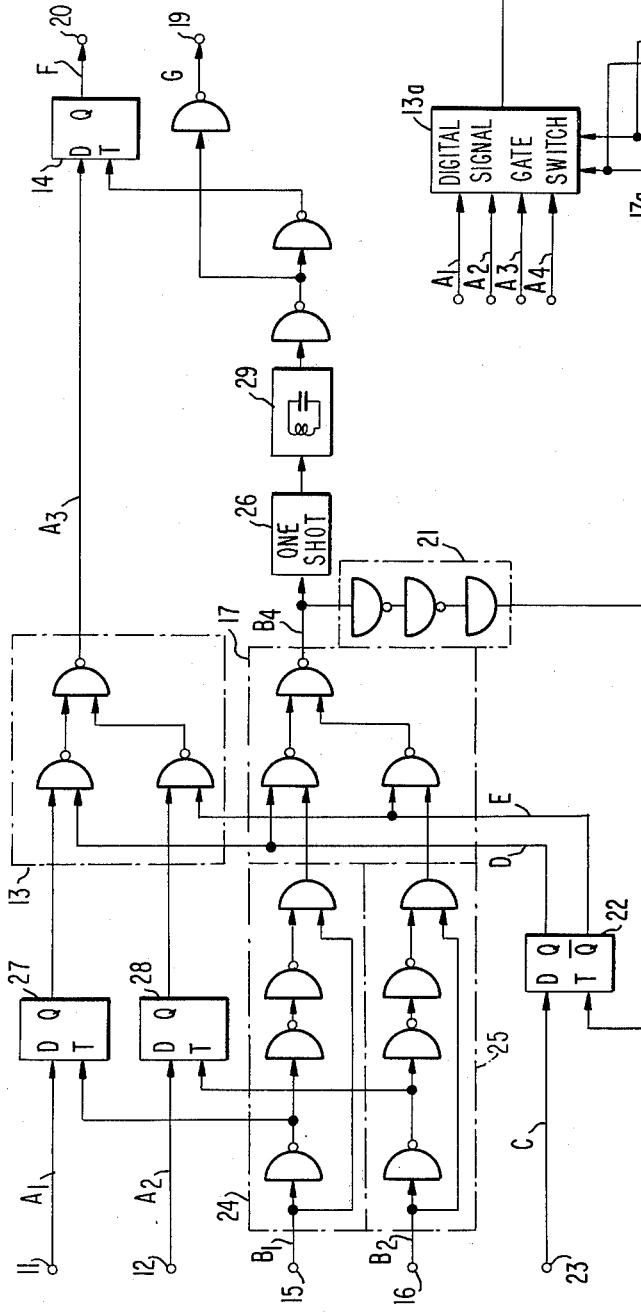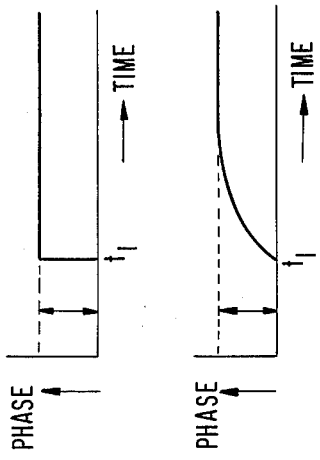

BASEBAND SIGNAL SWITCHING ARRANGEMENT FOR DIVERSITY RECEPTION IN PCM RADIO COMMUNICATION SYSTEM

BACKGROUND OF THE INVENTION

This invention relates to baseband signal switching arrangements for diversity reception in a pulse-modulated microwave communication system.

Generally, in a radio communications system, diversity reception technique is employed to enhance the reliability by minimizing the effects of fading with selection of signals received through two or more radio wave propagation paths provided therefor. As is well known, the diversity reception system takes a number of forms, including a space diversity reception which utilizes transmission through a plurality of propagation paths by employing receiving antennas placed in different locations and a frequency deversity reception which utilizes transmission through a plurality of propagation paths by using different carrier wave frequencies. One example of the space diversity reception system is described in a publication, the "IEEE Transactions on Communications Technology," Vol. 15, No. 4, Aug. 1967, pp. 603~614. The selection of the signals received through the propagation paths is effected in either the intermediate frequency band stage or the baseband stage of the diversity receiver. In such a system, those signals propagated through the fading-affected propagation paths are disconnected while the unaffected signal is led to the receiver output. When one of the propagation paths is switched to the other paths, an instantaneous signal interruption is inevitably caused at the receiver output. Such signal interruption has no appreciably adverse effects upon the signal being received as far as analog signal communications are concerned. In the case of the digital signal transmission, however the instantaneous signal interruption causes not only the collapse of the synchronized state of the system as a whole but also the loss of information being transmitted. Furthermore, it gives rise to bit errors in its output. Under the situation, there is an increasing demand for a switching device capable of selecting the favorable propagation path without causing any instantaneous signal interruption and thus without resulting bit errors in its output.

SUMMARY OF THE INVENTION

The present invention is intended to meet the demand described above and has for its object the provision of a baseband signal switching arrangement for deversity reception which is capable of selecting any one of respective digital signals received through a plurality of the propagation path provided therefor without causing any bit errors in the output.

According to the present invention, there is provided a baseband signal switching arrangement for the diversity reception of pulse-modulated microwaves, comprising a digital signal gate switch for selecting one of a plurality of digital signals carrying the same information, a clock signal gate switch for selecting one of a plurality of clock signals extracted respectively from said digital signals, a delay circuit for delaying the clock signal selected by said clock signal gate switch, and a control signal read-out circuit arranged to be fed with the output of said delay circuit to read out a switching control signal separately fed to said control signal read-out circuit so that said digital signal and clock signal gate switches are controlled simultaneously by the output of said control signal read-out circuit.

BRIEF DESCRIPTION OF THE DRAWINGS

The above and other objects, features and advantages of the present invention will be described in detail in conjunction with the accompanying drawings in which:

FIGS. 5a and 5b graphically illustrate phase response characteristics of a tank circuit usable in the switching arrangement of the present invention;

FIG. 6 illustrates a specific circuit construction of the switching arrangement shown in FIG. 3; and FIG. 7 is a block diagram illustrating another embodiment of the present invention as applied to a quadruple deversity reception system.

DESCRIPTION OF THE PREFERRED EMBODIMENTS

Figure 1:
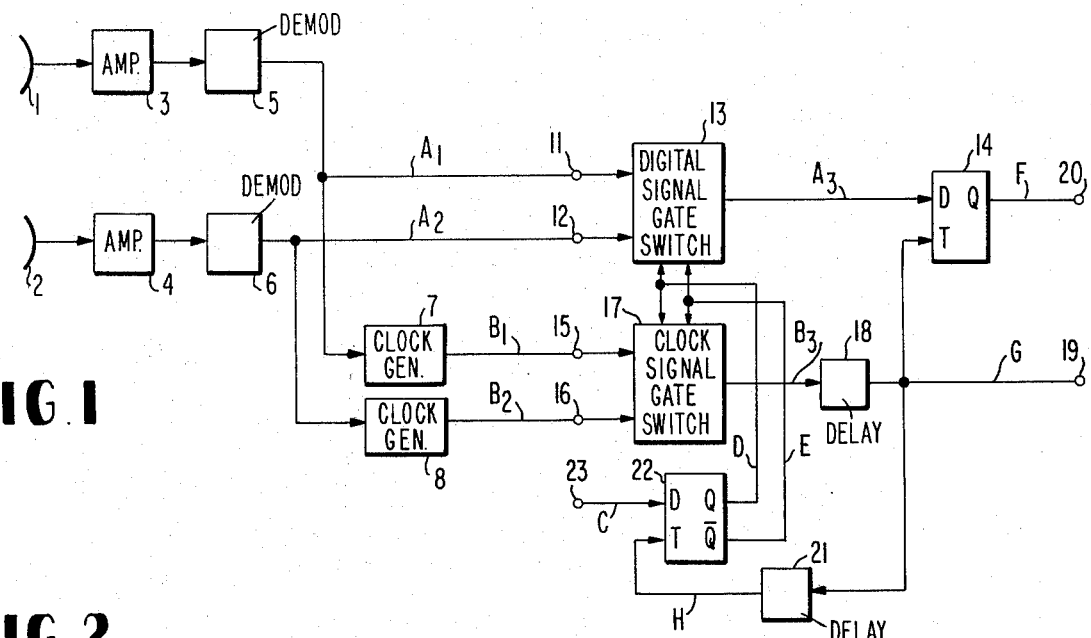
FIG. 1 is a block diagram of a baseband signal switching arrangement embodying the present invention as applied to a diversity reception system.

Reference will first be made to FIG. 1 showing a preferred embodiment of the present invention as applied to a diversity reception system. In this Figure, reference numerals 1 and 2 indicate receiving antennas arranged to receive respective carrier waves modulated with identical digital signals and propagated through a first and a second propagation paths, respectively. The carrier waves received at the antennas 1 and 2 are first amplified by respective amplifiers 3 and 4, each including high frequency stage and intermediate frequency stage, and then demodulated by respective demodulators 5 and 6 into baseband digital signals $A_1$ and $A_2$. The demodulated signals $A_1$ and $A_2$ obtained in this manner are fed to a digital signal gate switch 13 through respective input terminal 11 and 12 thereof and either the digital signal $A_1$ or $A_2$ is selected as the output $A_3$ of the gate switch 13, which is fed to a digital signal read-out circuit 14, for example, comprised of an edge-triggered flip-flop.

On the other hand, clock signals $B_1$ and $B_2$ corresponding with the respective digital signals $A_1$ and $A_2$ are obtained through respective clock signal regenerating circuits 7 and 8 and fed to a clock signal gate switch 17 through input terminals 15 and 16 thereof so that either the clock signal $B_1$ or $B_2$ is selected to appear at the output side of the clock signal gate switch 17, as indicated at $B_3$. The selected clock signal $B_3$ is fed through a delay circuit 18 to the digital signal read-out circuit 14 as a readout timing signal therefor. The delay circuit 18 is intended to enable the read-out circuit 14 to read out the stored digital $A_3$ at a point as close with the middle of the bit width of the signal $A_3$ as possible and the read-out timing signal is delayed relative to the selected clock signal $B_3$ by an appropriate time length $\tau_3$, for example, corresponding to one-half of bit width T. The output of the delay circuit 18 is also led to a terminal 19 as a clock output. The digital signal fed to the read-out circuit 14 is thus read out to appear at an output terminal 20 in synchronism with the clock signal appearing at terminal 19.

The output of the delay circuit 18 is also directed to another delay circuit 21 to be delayed further by a length of time $\tau_4$, which corresponds to one-fourth of the bit width T. The output of the delay circuit 21 is fed to a control signal read-out circuit 22, comprised of an edge-triggered flip-flop, as a read-out timing signal therefor. Also, a switching control signal C is applied to the input of the read-out circuit 22 through a terminal 23. Such control signal C is read out by the read-out circuit 22 under the timing of the delayed clock signal input thereto, serves the function for controlling the switching between the digital signals $A_1$ and $A_2$. In other words, the control signal stored by the read-out circuit 22 is read out to control the gate switches 13 and 17 and, for example, the digital signal $A_1$ and the clock signal $B_1$ are selected when the control signal C is at its higher level of "1", the digital signal $A_2$ and the clock signal $B_2$ being selected when the control signal C is at its lower level of "0". Incidentally the control signal C can be obtained, for example, by an error rate monitor means connected to the output side of the demodulator 5 or 6 through an appropriate branch circuit to detect any impairment of the propagation path.

Figure 2:
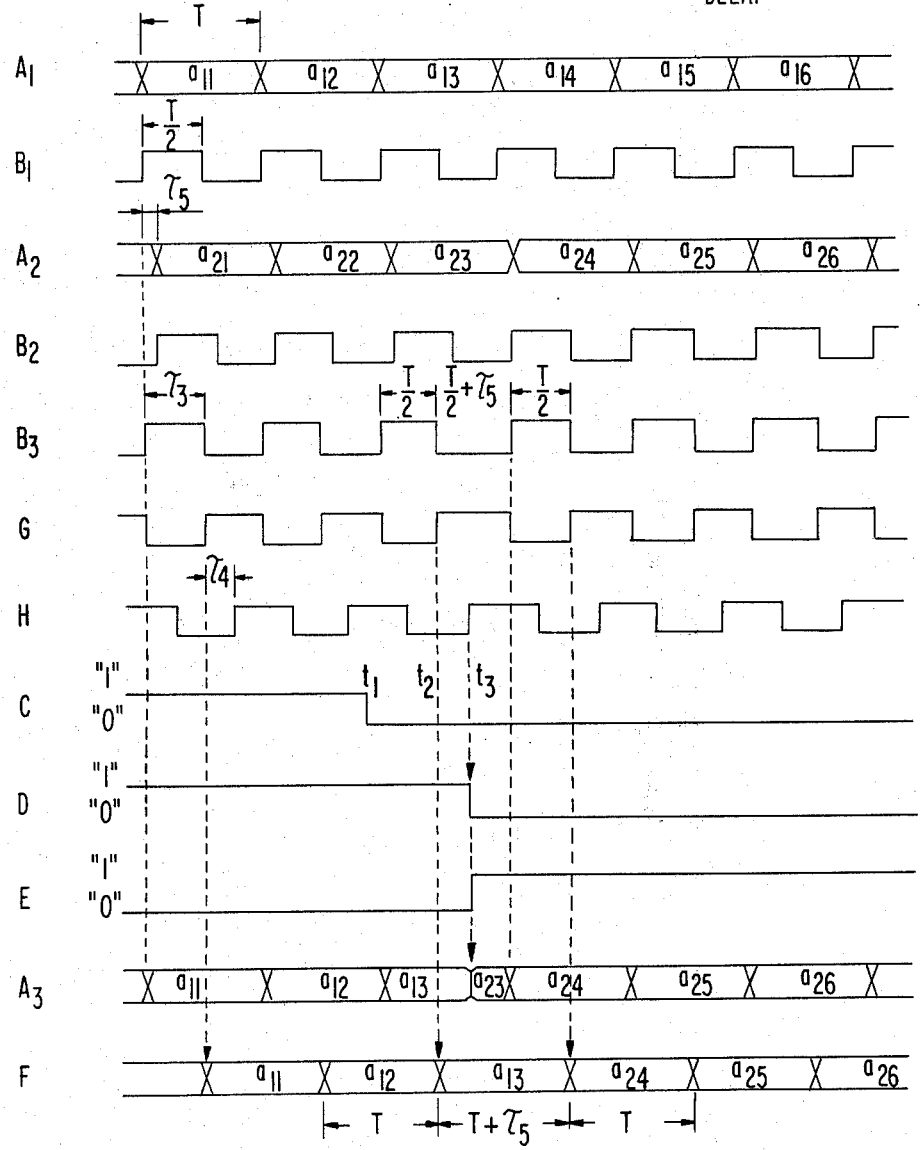
FIG. 2 is a time chart illustrating signal waveforms appearing in operation at various points in the arrangement of FIG. 1.

Description will next be made of the signal forms appearing at various points in the above-described baseband signal switching device with reference to FIG. 2, in which reference character $A_1$ indicates the baseband degital signal extracted through the first propagation path; $B_1$, its clock pulses; $A_2$, the baseband digital signal extracted through the second propagation path; $B_2$, its clock pulses; $A_3$, the output of the digital signal gate switch 13, $B_3$, the output of the clock signal gate switch 17; G, the output of the delay circuit 18 or the clock pulses appearing at the output terminal 19; H, the output of the delay circuit 21; D and E, the Q and $\bar{Q}$, outputs of control signal read-out circuit 22, respectively; and F, the Q output of the digital signal read-out circuit 14. Codes $a_{11}, a_{12}, a_{13}, \ldots$ of the baseband digital signal $A_1$ are of the same information contents as codes $a_{21}, a_{22}, a_{23}, \ldots$ of the baseband digital signal $A_2$. In this case, there is a phase difference in transmission time, $\tau_5$, between the first and second propagation paths. The delay of signals corresponding to the operating time of each of circuit components such as gates or flipflops is ignored.

Assuming first that the switching control signal C entering through the terminal 23 is of the level 1, the digital signal $A_1$ arriving through the first propagation path is selected. In this event, the outputs D and E of the control signal read-out circuit 22 take the codes of 1 and 0, respectively, the outputs $A_3$ and $B_3$ of the respective gate switches 13 and 17 taking the form of digital signals $A_1$ and clock signal $B_1$, respectively. Accordingly, the digital signal read-out circuit 14 reads out its input $A_3$ at the point of rise of the output G of the delay circuit 18, producing an output F, which is identical with the digital signal $A_1$ received through the first propagation path except that it is delayed relative thereto by a length of time $\tau_3$.

On the other hand, the control signal read-out circuit 22 reads out the switching control signal C at the point of rise of the read-out timing signal or the output signal H from the delay circuit 21. Now assuming that the control signal C, entering the read-out circuit 22 through the input terminal 23 is changed from 1 to 0 at a point of time $t_1$, the selection of the digital signal $A_2$ received through the second propagation path is dictated. Then, the 0 state of the control signal C is read out in the read-out circuit 22 at the next following point of rise, $t_3$, of the output signal H from the delay circuit 21. In this manner, the outputs D and E of the read-out circuit 22 are reversed to the states of 0 and 1, respectively. With this reversal, the outputs $A_3$ and $B_3$ of the respective gate switches 13 and 17 are changed to the digital signal $A_2$ and the clock signal $B_2$, respectively. The digital signal read-out circuit 14, however, has already read out code $a_{13}$ of the previously selected digital signal $A_1$, at the point of time, $t_2$, which is earlier than the time $t_3$ of the switching operation. The next code which is actually read out by the digital signal read-out circuit 14 becomes code $a_{24}$ of the digital signal $A_2$, which follows the code $a_{23}$ thereof. It is to be appreciated, therefore, that there takes place no code interruption whatsoever despite the digital signal switching.

With the embodiment described above, it will be noted that no bit error occurs accompanying the switching operation as long as the phase difference $\tau_5$ between the first and second propagation paths is within the range of $\pm T/4$. If, however, the phase difference $\tau_5$ goes out of this range and the clock pulses $B_2$ are delayed relative to the clock pulses $B_1$, for example, by an amount of T/2, the switching operation of the clock signal gate switch 17 occurs while the clock $B_2$ is at the high level 1. Immediately the clock signal output $B_3$ rises to the high level 1 so that the digital signal readout circuit 14 is read out. This means that in this case the code of the same contents is read out twice. In contrast to this, if the clock pulses $B_2$ are advanced with respect to clock pulses $B_1$ by an amount of T/2, one code is skipped.

Figure 3:
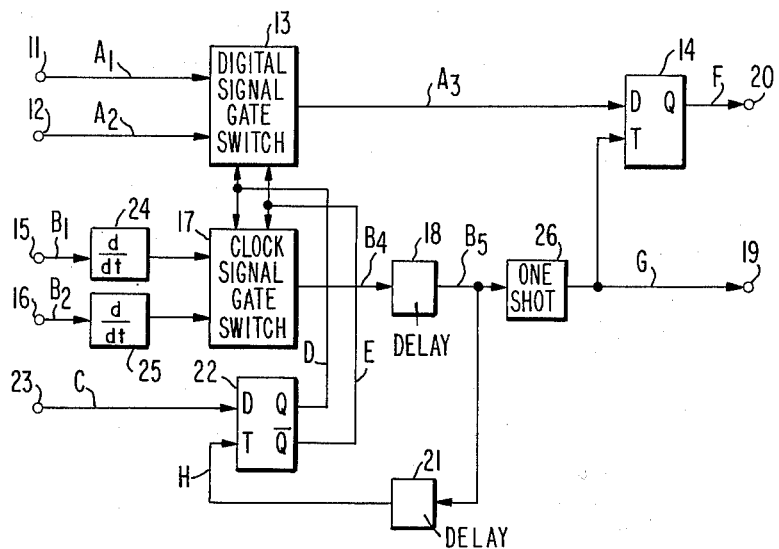
FIG. 3 is a block diagram illustrating another embodiment of the present invention.
Figure 4:
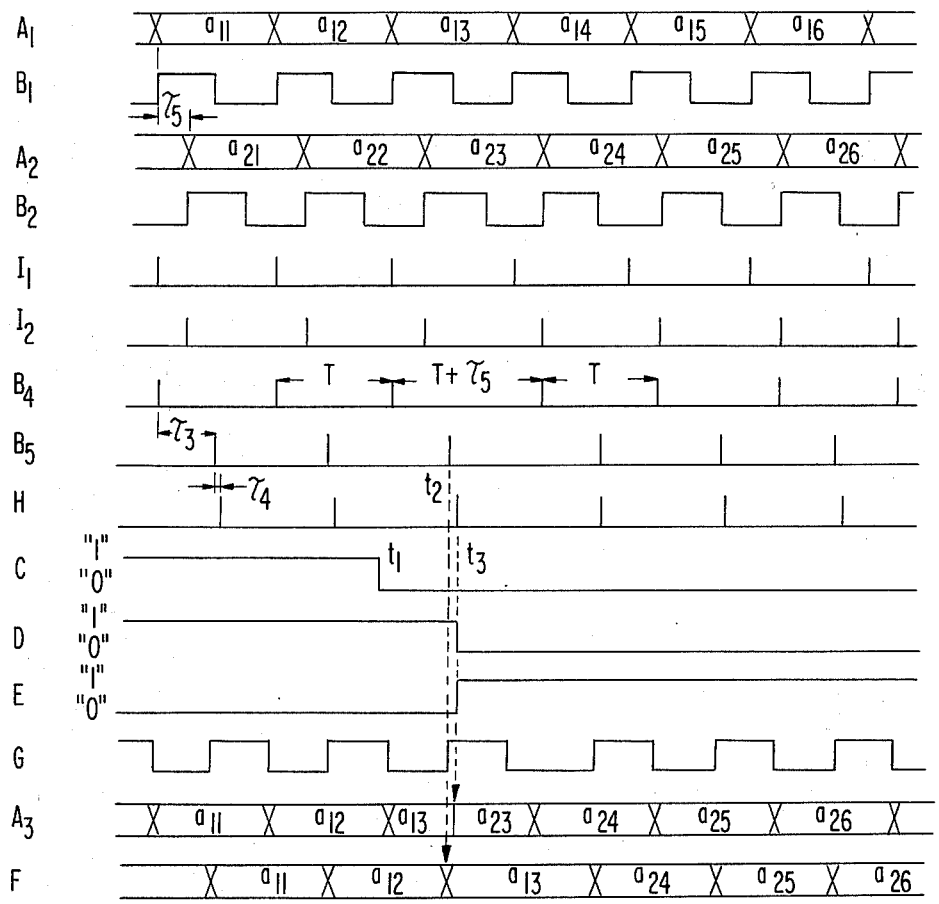
FIG. 4 is a time chart, similar to FIG. 2, illustrating signal forms appearing in the arrangement of FIG. 3.

Reference will next be made to FIG. 3 showing another embodiment of the present invention, with which the range of the transmission time defference between the two propagation paths may be safely increased. In this figure, the same reference numerals have been used as in FIG. 1 for similar parts. As observed, two differentiating circuits 24 and 25 are inserted on the input side of the clock signal gate switch 17 to differentiate the respective clock pulses $B_1$ and $B_2$ so that only the rises $I_1$ and $I_2$ of the respective clock pulses $B_1$ and $B_2$ are selected to be fed to the clock signal gate switch 17. Obviously, the output $B_4$ of the clock signal gate switch 17 takes the form of pulses of an extremely limited width. Accordingly, the control signal read-out timing may safely be made close to such pulses of the gate output $B_4$. It is to be understood that the delay period $\tau_4$ of the delay circuit 21 is selected within the range of $0<\tau_4<<T/4$. The delayed output $B_5$ is converted into the form of 50% duty pulses by means of a monostable multivibrator 26 so as to be directed to the output terminal 19 and the digital signal read-out circuit 14. The signal states at various portions in this baseband signal switching circuit are shown in the chart of FIG. 4 for comparison with those shown in FIG. 2. With this embodiment, since the inputs to the clock signal gate switch 17 take the form of pulses of extremely limited width, as described above, there is no occurrence of bit errors in the digital signal output as resulting from the switching operation, as long as the phase difference $\tau_5$ between the digital signals $A_1$ and $A_2$ is within the range of $\pm T/2$.

In case where such a wide range is allowed for the phase difference $\tau_5$, the time length of code $a_{13}$ of the output digital signal F and the pulse width of the output signal G at the instant of switching must vary suddenly from T to $(T \pm \tau_5)$, as observed in the chart of FIG. 4. Such a variation gives rise to the possibility of misoperation of a frame synchronizer, a code detector or other devices employing in the stages following the switching device. Such possibility, however, can be minimized, for example, by inserting a tank circuit in the output side of the monostable multivibrator 26. The input signal to such tank circuit shifts suddenly at the point of time $t_1$ by a phase angle of $\phi$, as shown in FIG. 5($a$), but the output signal of such circuit varies only gradually, as shown in FIG. 5($b$), so that there is no misoperation taking place in the following stages despite of the change in length of the period T of the digital and clock signals.

The circuit construction of the baseband digital signal switching arrangemet shown in FIG. 3 is illustrated in further detail in FIG. 6, in which the same reference numerals have been used as in FIG. 3 for similar parts. As observed, the differentiating circuits 24 and 25 are respectively composed of a number of NAND circuits and an AND circuit. Further, in the construction illustrated, the digital signals $A_1$ and $A_2$ are first fed to respective edge-triggered flipflops 27 and 28 and then read out thereof by means of respective clock signals $B_1$ and $B_2$ to be fed to the digital signal gate switch 13. Reference numeral 29 represents the tank circuit inserted in the output side of the monostable multivibrator 26.

While the embodiments described above are based on the assumption that there are only two propagation paths, the present invent is applicable to those diversity reception system utilizing three or more propagation paths. The present invention as applied to a quadruple diversity reception system is shown in FIG. 7. In the drawing, a digital signal gate switch 13$a$ is composed of the gate circuit to select one from four digital signal inputs $A_1$, $A_2$, $A_3$ and $A_4$. Similarly, a clock signal gate switch 17$a$ is made of the gate circuit to select one from four clock signal inputs $B_1$, $B_2$, $B_3$ and $B_4$. Also, a control signal read-out circuit 22$a$ has two edge-trrigered flip-flop circuits 22$a$-1 and 22$a$-2. Two switching control signals $C_1$ and $C_2$ are respectively applied to the flip-flop circuits 22$a$-1 and 22$a$-2 so that their input signals are simultaneously lead out by the output of the delay circuit 21. The respective four input signals of the gate switches 13$a$ and 17$a$ are selectively switched by a pair of outputs read out from the flip-flop circuit 22$a$-1 and the flip-flop circuit 22$a$-2, in accordance with four states in which two switching control signals $C_1$ and $C_2$ are made in combination as the codes 0 and 0, 0 and 1, 1 and 1 and 1 and 0.

It will readily be appreciated from the foregoing description that, according to the present invention, a plurality of baseband digital signals encoded with the same digital information can be selectively switched together with their respective clock signal without causing the bit error resulting from the instantaneous signal interruption.

While a few embodiments of the present invention have been shown and described, if will be apparent to those skilled in the art that many changes and modifications may be made therein without departing from the spirit of the invention or the scope of the appended claim.

What is claimed is:

1. In a diversity reception digital communication system including means for receiving a plurality of carrier waves modulated with identical digital signals and propagated through respective propagation paths, means for demodulating the received carrier waves into a plurality of baseband digital signals, and clock signal regenerating means responsive to the outputs of said demodulating means for extracting a plurality of clock signals from said baseband digital signals, the improvement in a baseband signal switching arrangement comprising:

a digital signal gate switch connected to receive the outputs of said demodulating means for selecting one of said plurality of baseband digital signals, a clock signal gate switch connected to receive the outputs of said clock signal regenerating means for selecting one of said plurality of clock signals corresponding to the selected baseband digital signals, a delay circuit for delaying the clock signal selected by said clock signal gate switch and a control signal read-out circuit connected to receive the output of said delay circuit to read-out a switching control signal separately fed to said control signal read-out circuit so that said digital signal gate switch and said clock signal gate switch are controlled simultaneously by the output of said control signal read-out circuit.

2. A baseband signal switching arrangement as recited in claim 1 further comprising a digital signal read-out circuit connected to said digital signal gate switch and said delay circuit for reading out the selected baseband digital signals in response to the delayed clock signal selected by said clock signal gate switch.

3. A baseband signal switching arrangement as recited in claim 2 further comprising:

means connected to the input of said clock signal gate switch differentiating each of the outputs of said clock signal regenerating means, and pulse converting means connected between said delay circuit and said digital signal read-out circuit for converting the output of said delay circuit for 50% duty pulses.

4. A baseband signal switching arrangement as recited in claim 3 further comprising a tank circuit connected between said pulse converting means and said digital signal read-out circuit.

* * * * *